United States Patent
Suzuki

(10) Patent No.: US 7,366,073 B2
(45) Date of Patent: Apr. 29, 2008

(54) INFORMATION RECORDING APPARATUS AND METHOD, AND COMPUTER PROGRAM PRODUCT

(75) Inventor: Hiroshi Suzuki, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 670 days.

(21) Appl. No.: 11/031,008

(22) Filed: Jan. 10, 2005

(65) Prior Publication Data

US 2005/0152254 A1    Jul. 14, 2005

(30) Foreign Application Priority Data

Jan. 8, 2004    (JP)    ............................ 2004-003069

(51) Int. Cl.
G11B 20/10    (2006.01)

(52) U.S. Cl. .................................. 369/53.26; 369/47.5

(58) Field of Classification Search .................... None
See application file for complete search history.

(56) References Cited

U.S. PATENT DOCUMENTS 5,450,383 A * 9/1995 Call et al. ................. 369/47.52
5,790,482 A * 8/1998 Saga et al. ................ 369/13.27

FOREIGN PATENT DOCUMENTS

JP    2001-351249    12/2001

* cited by examiner

Primary Examiner—Paul W. Huber
(74) Attorney, Agent, or Firm—Young & Thompson

(57) ABSTRACT

An information recording apparatus is provided with: a recording device for recording information into recording areas of an information recording medium by irradiating laser light; a reference-output-value holding device for holding a reference-output-value of the laser light for recording the information into the recording areas; an estimating device for estimating an output value of the laser light which was irradiated in the past in an already-recorded-area in which the information is already recorded; and a controlling device for controlling said recording device to irradiate the laser light onto the already-recorded-area with an output value larger than the reference output value if the estimated output value is larger than the reference output value.

12 Claims, 10 Drawing Sheets

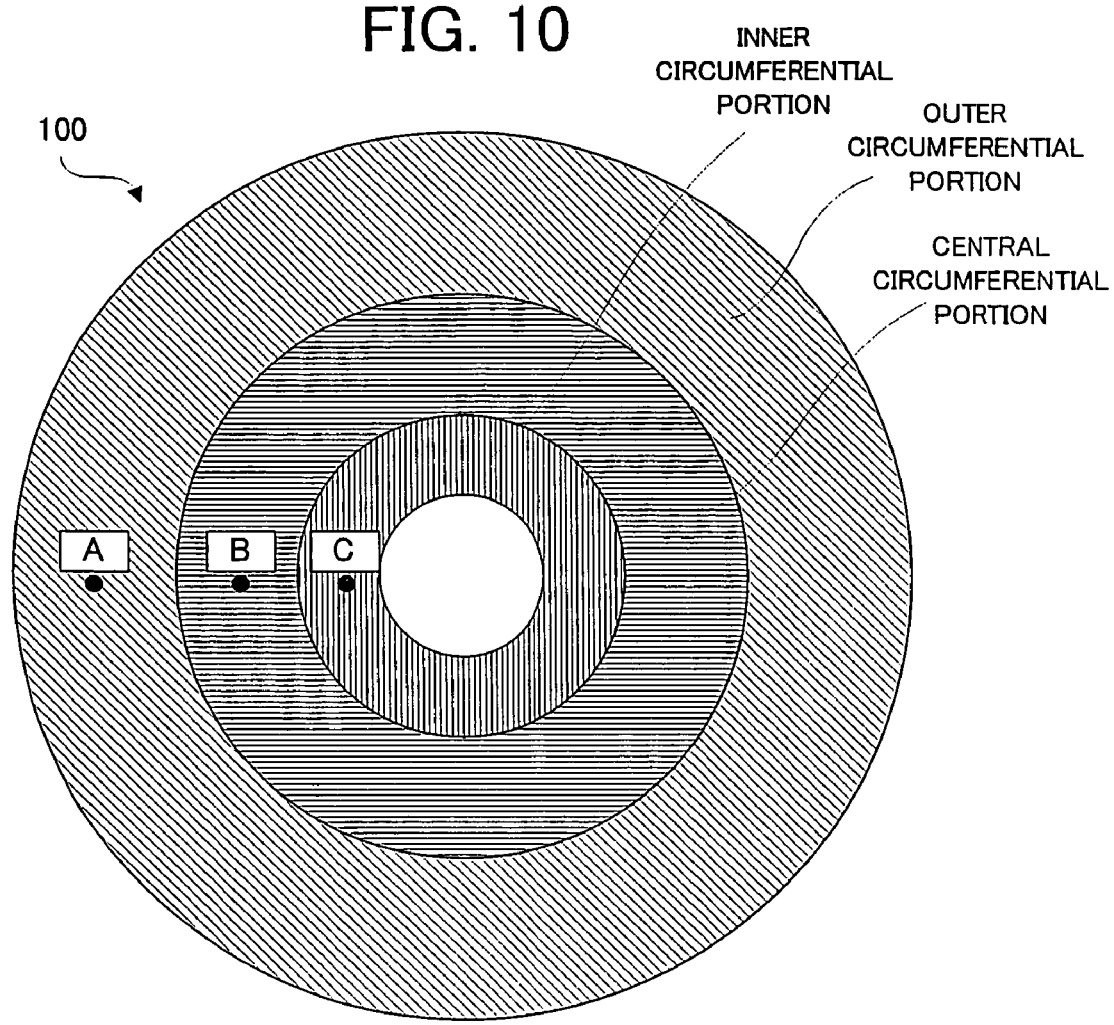

INFORMATION RECORDING APPARATUS AND METHOD, AND COMPUTER PROGRAM PRODUCT

BACKGROUND OF THE INVENTION

1. Field of the Invention

The present invention relates to an information recording apparatus, such as a DVD recorder, an information recording method, and a computer program product which makes a computer function as the information recording apparatus.

2. Description of the Related Art

In an information recording/reproducing apparatus for recording information onto an information recording medium, for example, an optical disc or the like, such as a CD-RW (Compact Disc-Read Only Memory) and a DVD-RW, the optimum power of a recording power is set by Optimum Power Control (OPC) processing in accordance with the type of the optical disc, the type and the recording speed of the information recording/reproducing apparatus, and the like. Namely, the calibration of the recording power is performed. This makes it possible to realize an appropriate record operation in the optical disc. For example, if the optical disc is inserted or loaded, and a command of writing is inputted, light intensity is changed step-by-step sequentially, and the data for trial writing is recorded into an OPC area, so that so-called trial writing is performed. Afterward, the data for trial writing recorded in this manner is reproduced. The reproduction result is judged by a predetermined evaluation reference, and the optimum power is set. optimum power is set.

Then, by irradiating laser light with the optimum power obtained by this OPC processing, the record operation is performed. Moreover, in recording (i.e. overwriting) new data into a recording area in which data is already recorded, the laser light is directly irradiated with the optimum power, without an independent delete operation. This is generally referred to as "Direct Overwrite".

Japanese Patent Application Laying Open No. 2001-351249 discloses such a technique that whether the Direct Overwrite is performed with the optimum recording power or with a smaller recording power than the optimum recording power is selected in accordance with a condition of the recording area in which the data is recorded. This technique makes it possible to increase durability of the information recording medium which is an object of the record operation.

However, in the above-described Direct Overwrite operation, there is such a technical problem that the recording quality of the newly recorded data varies depending on the record condition of the previously recorded data. Specifically, in some cases, the record condition of the previously recorded data may cause various bad influences, such as reduction of a jitter value, increase in a reproduction error rate, and impossibility to obtain a preferable asymmetry value. Such conditions are not desirable from the viewpoint of the more preferable record or reproduction of the data.

In order to avoid this situation, it is also conceivable to perform the delete condition once, and then perform the record operation in another time. However, it doubles the labor in the irradiation of the laser light, and it is not desirable from the viewpoint of realization of the quick record operation.

SUMMARY OF THE INVENTION

It is therefore an object of the present invention to provide an information recording apparatus, an information recording method, and a computer program, which can improve the recording quality of the data, for example.

Information Recording Apparatus

The above object of the present invention can be achieved by an information recording apparatus provided with: a recording device for recording information into recording areas of an information recording medium by irradiating laser light; a reference output value holding device for holding a reference output value of the laser light for recording the information into the recording areas; an estimating device for estimating an output value of the laser light which was irradiated in the past to an already recorded area in which the information is already recorded, out of the recording areas; and a controlling device for controlling the recording device to irradiate the laser light onto the already recorded area with an output value larger than the reference output value if the estimated output value is larger than the reference output value.

According to the information recording apparatus of the present invention, it is possible to record the information (e.g. a video information, an audio information, an information for computer operation, or the like) onto the information recording medium by virtue of the operation of the recording device. Particularly, the information can be recorded by irradiating the laser light with its output (the output value) approximately controlled.

Particularly in the present invention, by virtue of the operation of the estimating device, it is possible to estimate the output value of the laser light which was irradiated in the past (specifically when the information was recorded) onto the already recorded area in which the information is already recorded, out of the recording areas of the information recording medium. Here, the "output value" of the present invention broadly includes not only the information which directly indicates the output value itself of the laser light, but also the information which indirectly indicates the output value of the laser light as in the case where the output value is obtained by an operation or calculation or the like (e.g. degree of modulation described later or the like). If the output value estimated by the estimating device is larger than the reference output value, by virtue of the operation of the controlling device, the information is recorded into the already recorded area by irradiating the laser light with the output value larger than the reference output value. The "reference output value" of the present invention is an output value which is a reference or standard of the laser light irradiated when the information is recorded onto the information recording medium. The "reference output value" may be an output value of the laser which pre-recorded in the information recording medium or may be an optimum output value calculated by a calculating device described later.

If the information recorded in the already recorded area is recorded with the output value larger than the reference output value, it can be considered that the condition of the already recorded area (e.g. a crystal condition) changes relatively greatly. In this case, even if the information is recorded (i.e. overwritten) into the already recorded area with the reference output value, it is impossible or hardly possible to appropriately change the condition of the already recorded area, or to appropriately delete the change by the irradiation of the laser light in the past due to the irradiation of the laser light at the relatively small reference output value. This is not preferable in terms of appropriate information recording or high-quality information recording.

In the present invention, if the information recorded in the already recorded area is recorded with the output value larger than the reference output value, it is possible to record the information into the already recorded area by irradiating the laser light with the output value larger than the reference output value (e.g. at the estimated output value). Therefore, it is possible to appropriately change the condition of the already recorded area or to appropriately delete the change by the irradiation of the laser light in the past, so that it is possible to solve the above-described problems. Thus, even if the information is newly recorded (i.e. overwritten) into the already recorded area, it is possible to preferably maintain the recording quality of the information which is newly recorded. Namely, it is possible to improve the recording quality.

Incidentally, in the above-described background, the laser light with the output value smaller than the reference output value is irradiated to improve the durability of the information recording medium. In the embodiment, the laser light with the output value larger than the reference output value is irradiated to improve the recording quality of the information which is recorded onto the information recording medium. At this point, the present invention gives new, novel or completely different and unique effects.

Consequently, according to the information recording apparatus of the present invention, it is possible to preferably improve the recording quality of the information which is recorded. As a result, it is possible to realize higher-quality reproduction in reproducing the information, which is a large advantage.

In one aspect of the information recording apparatus of the present invention, the information recording apparatus is further provided with a calculating device for calculating an optimum output value of the laser light for recording the information into the recording areas, wherein the reference output value is substantially the optimum output value calculated by the calculating device.

According to this aspect, since the optimum output value of the laser light can be used as the reference output value, it is possible to further improve the recording quality of the information (specifically, the information which is overwritten into the already recorded area). Incidentally, the "optimum output value" of the present invention broadly includes the output value of the laser light to record the information more appropriately in recording to an extent, in addition to the most appropriate output value. This optimum output value may be the output value calculated by the OPC described later.

In an aspect of the information recording apparatus provided with the calculating device as described above, the calculating device may calculate the optimum output value on the basis of a correspondence relationship between the output value of the laser light and degree of modulation, which indicates recording quality of the information.

In such construction, it is possible to appropriately calculate the optimum output value on the basis of the correspondence relationship. The calculated optimum output value is preferably held by the above-described reference output value holding device.

In another aspect of the information recording apparatus of the present invention, the controlling device controls the recording device to irradiate the laser light onto the already recorded area with an output value smaller than or equal to the estimated output value.

According to this aspect, at each time the recording of the information is repeated into the already recorded area, it is possible to reduce the output value which is estimated. Therefore, it is possible to eventually converge the output value of the laser light in recording to the optimum output value.

In another aspect of the information recording apparatus of the present invention, the controlling device controls the recording device to irradiate the laser light onto the already recorded area with the reference output value, if the estimated output value is smaller than or equal to the reference output value.

According to this aspect, it is possible to appropriately irradiate the laser light with the reference output value. Therefore, in any relationship between the estimated output value and the reference output value, it is possible to improve the recording quality of the information which is recorded.

In another aspect of the information recording apparatus of the present invention, the information recording apparatus is further provided with a storing device for temporarily storing the information, wherein the estimating device estimates the output value by using a time length to store the information into the storing device.

According to this aspect, it is possible to perform the above-described various operations by effectively using the time length to store the information. Therefore, it is possible to receive the above-described various benefits, without any load on the record operation by the information recording apparatus of the present invention. Particularly, there is such an advantage that there is no influence on the recording speed, the time length required for the information recording, or the like.

In another aspect of the information recording apparatus of the present invention, the estimating device estimates the output value in the information recording medium, before the information is recorded.

According to this aspect, since the output value can be estimated throughout the information recording medium, it is unnecessary to perform the operation by the estimating device, during the record operation by the recording device. Therefore, it is possible to realize the higher-speed record operation.

In another aspect of the information recording apparatus of the present invention, the controlling device controls the recording device to irradiate the laser light onto both the already-recorded-area and a recording area in a substantially same record condition as that of the already-recorded area, with an output value larger than the reference output value.

According to this aspect, it is possible to irradiate the laser light with the larger output value even onto the recording area which is predictively in substantially the same record condition as that of the already recorded area. The "same record condition" indicates such a condition that the information already recorded in the already recorded area and the information recorded in a certain recording area has the substantially same recording quality (e.g. the degree of modulation or the like). For example, it indicates such a condition that the information already recorded in the already recorded area and the information recorded in a certain recording area are recorded by irradiating the laser light having the same or substantially the same output value.

Therefore, if the output value in a certain already recorded area can be estimated, it is possible to record the information in a recording area larger than the already recorded area, by irradiating the laser light at the estimated output value. Therefore, it is unnecessary to estimate the output value throughout the information recording medium, to thereby simplify the record operation.

In another aspect of the information recording apparatus of the present invention, the information recording apparatus is further provided with a selecting device for selecting whether or not the recording device is controlled by the controlling device, wherein the controlling device controls the recording device if it is selected by the selecting device that the recording device is controlled.

According to this aspect, by virtue of the selecting device, it is possible to select whether or not to perform a change operation of changing the recording laser power described above, in accordance with a user's selection on the information recording apparatus of the present invention.

In another aspect of the information recording apparatus of the present invention, the estimating device detects degree of modulation of an existing record, which indicates recording quality of the information already recorded in the already-recorded-area, and estimates the output value on the basis of the detected degree of modulation of an existing record and a correspondence relationship between the output value of the laser light and degree of modulation, which indicates recording quality of the information.

According to this aspect, it is possible to appropriately estimate the output value on the basis of the degree of modulation of an existing record and the correspondence relationship.

Information Recording Method

The above object of the present invention can be also achieved by an information recording method in an information recording apparatus provided with: a recording device for recording information into recording areas of an information recording medium by irradiating laser light; and a reference output value holding device for holding a reference output value of the laser light for recording the information into the recording areas, the information recording method provided with: an estimating process of estimating an output value of the laser light which was irradiated in the past to an already recorded area in which the information is already recorded, out of the recording areas; and a controlling process of controlling the recording device to irradiate the laser light onto the already recorded area with an output value larger than the reference output value if the estimated output value is larger than the reference output value.

According to the information recording method of the present invention, it is possible to receive the same various benefits as in the above-described information recording apparatus of the present invention.

Incidentally, in response to various aspects in the above-described information recording apparatus of the present invention, the information recording method of the present invention can also adopt various aspects.

Computer Program Product

The above object of the present invention can be achieved by a computer program product in a computer-readable medium for tangibly embodying a program of instructions executable by a computer in the above-described information recording apparatus (including its various aspects) to make the computer function as at least one of the estimating device and the controlling device.

According to the computer program product of the present invention, the above-described information recording apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-described information recording apparatus.

Incidentally, in response to various aspects in the above-described information recording apparatus of the present invention, the computer program product of the present invention can also adopt various aspects.

The nature, utility, and further features of this invention will be more clearly apparent from the following detailed description with reference to preferred embodiment of the invention when read in conjunction with the accompanying drawings briefly described below.

BRIEF DESCRIPTION OF THE DRAWINGS

FIG. 10 is a plan view showing a recording surface of an optical disc onto which data is recorded by the information recording apparatus in the embodiment.

DETAILED DESCRIPTION OF THE PREFERRED EMBODIMENT

An embodiment of the present invention will be hereinafter explained with reference to the drawings.

Basic Structure

Figure 1:
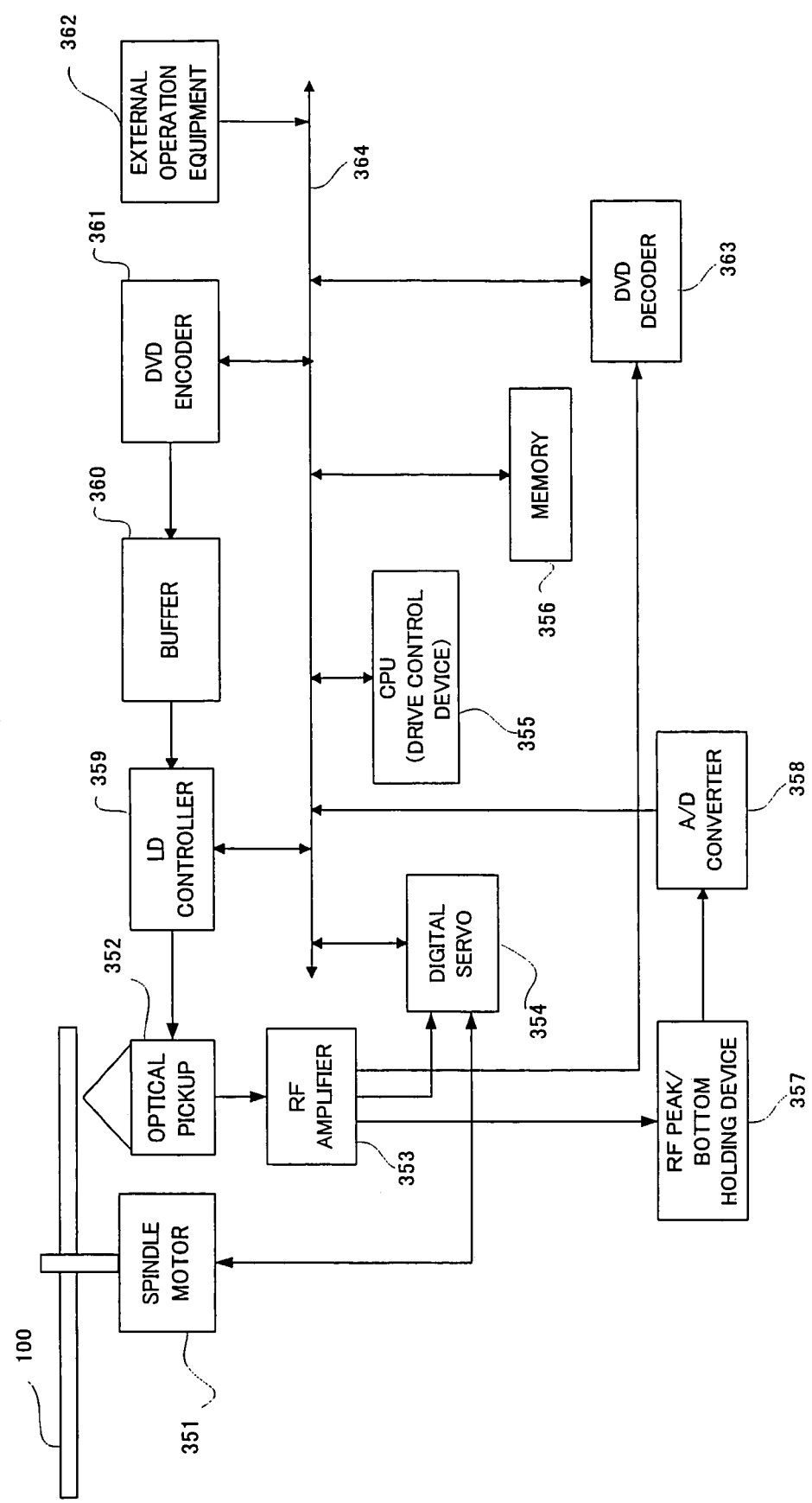
FIG. 1 is a block diagram conceptually showing a basic structure of an information recording apparatus in an embodiment of the present invention.

At first, the basic structure of the information recording apparatus in the embodiment will be explained with reference to FIG. 1. FIG. 1 conceptually shows the basic structure of the information recording apparatus in the embodiment.

As shown in FIG. 1, an information recording apparatus 300 is an apparatus for recording information onto an optical disc 100 and reading the information recorded on the optical disc 100, under the control of a Central Processing Unit (CPU) 355.

With respect to the optical disc 100 used in the embodiment, a disk-shaped optical disc such as a DVD, a CD, and the like are listed as one specific example. Without limiting to the disk-shaped optical disc, any optical disc which can record the data by irradiating laser light can be used on the information recording apparatus 300 in the embodiment.

The information recording apparatus 300 is provided with: a spindle motor 351; an optical pickup 352; a RF amplifier 353; a digital servo 354; a CPU (drive control device) 355; a memory 356; a RF peak/bottom holding device 357; an Analog/Digital (A/D) converter 358; a Laser Diode (LD) controller 359; a buffer 360; a DVD encoder 361; an external operation equipment 362; a DVD decoder 363; and a bus 364.

The spindle motor 351 rotates and stops the optical disc 100, and operates in accessing the optical disc 100. More specifically, the spindle motor 351 is constructed to rotate and stop the optical disc 100 at a predetermined speed while receiving spindle servo from the digital servo 354 or the like.

The optical pickup 352 is one specific example of the "recording device" of the present invention. The optical pickup 352 performs record/reproduction with respect to the optical disc 100, and is provided with a laser apparatus, lenses, and the like. More specifically, upon reproducing, the optical pickup 352 irradiates a light beam, such as a laser beam, onto the optical disc 100 as reading light with a first power. Upon recording, the optical pickup 352 irradiates a light beam, with it modulated, onto the optical disc 100 as writing light with a second power.

The RF amplifier 353 receives reflected light of the laser light irradiated by the optical pickup 352, to thereby detect a RF signal as being a reproduction signal. Moreover, from the detected RF signal, the RF amplifier detects a servo signal for controlling the behaviors of the spindle motor 351 and the optical pickup 352 or the like.

The digital servo 354 controls the spindle motor 351 on the basis of the servo signal detected by the RF amplifier 353. Specifically, the digital servo 354 controls the rotational speed of the optical disc 100 or the like.

The CPU (drive control unit) 355 is connected, via the bus 364, to the digital servo 354, the memory 356, the LD controller 359, the DVD encoder 361, and the DVD decoder 363. The CPU 355 gives instructions to each control device, or passes the data with each control device, to thereby control the information recording apparatus 300 as a whole. Typically, software for the CPU 355 operating is stored in the memory 356.

The memory 356 is used for the whole data processing on the information recording apparatus 300. Moreover, the memory 356 is provided with: a ROM area in which a program for operating as the recorder equipment is stored; a RAM area in which parameters or data required for a program operation is temporarily stored; or the like.

The RF peak/bottom holding device 357 detects a peak value and a bottom value of the RF signal detected by the RF amplifier 353. More specifically, the RF peak/bottom holding device 357 includes an envelope detector or the like.

The A/D converter 358 can convert an analog signal outputted from the RF peak/bottom holding device 357 to a digital signal so that the data can be inputted/outputted via the bus 364.

The LD controller 359 oscillates a laser diode or the like of the optical pickup 352 at a predetermined frequency, to thereby control the laser beam irradiated from the optical pickup 352.

The buffer 360 is one specific example of the "storing device" and temporarily stores contents data which is a recording object or the like. Specifically, the contents data encoded by the DVD encoder 361 is temporarily stored into the buffer 360, and then recorded onto the optical disc 100. The buffer 360 may include a semiconductor memory, such as a RAM and a flash memory.

The DVD encoder 361 is constructed to perform DVD modulation (i.e. DVD encoding) with respect to the data for recording, and output it to the buffer 360. As the DVD modulation, for example, 8-16 modulation may be performed. It is constructed such that the data for recording is inputted from a data source to the DVD encoder 361 via an external input interface.

The external operation equipment 362 is constructed to input a user's instruction from the outside, in order to control the operation of the information recording apparatus 300. As the external operation equipment 362, various input devices can be used; for example, a remote control, a touch panel, an operation button and a panel, a mouse, a keyboard and the like. These input devices are connected to a Personal Computer (PC) and a DVD recorder main body, and passes the data typically by ATAPI (Advanced Technology Attachment Packet Interface).

Incidentally, the information recording apparatus 300 in the embodiment, which is explained with reference to FIG. 1, is also one embodiment of an information recording/reproducing apparatus. Specifically, the information recording apparatus 300 can reproduce the contents data or the like via the DVD decoder 363.

The DVD decoder 363 reproduces the RF signal by using a predetermined table and generates reproduction data. For example, if 8-16 modulation is adopted as the modulation method, a process of converting 16-bit pit data to 8-bit reproduction data is performed. Then, descramble processing in which the order of the reproduction data is rearranged in accordance with a predetermined rule is performed, and the processed reproduction data is outputted. Moreover, it may be constructed such that error correcting, interpolating, or the like is performed to the reproduction data.

Then, the reproduction data is decoded by a Moving Picture Experts Group (MPEG) decoder or the like, for example, outputted to an external output equipment, such as various displays, projectors, and speakers, via an external output interface, and reproduced. As described above, the information recording apparatus 300 in the embodiment includes a function of an information reproducing apparatus or a function of an information recording/reproducing apparatus.

However, in terms of the recording of various data including the contents data or the like, the DVD decoder 363 may not be provided.

Operation Principle

Next, with reference to FIG. 2 to FIG. 8 as occasion demands, the record operation of the information recording apparatus 300 in the embodiment will be explained.

Figure 2:
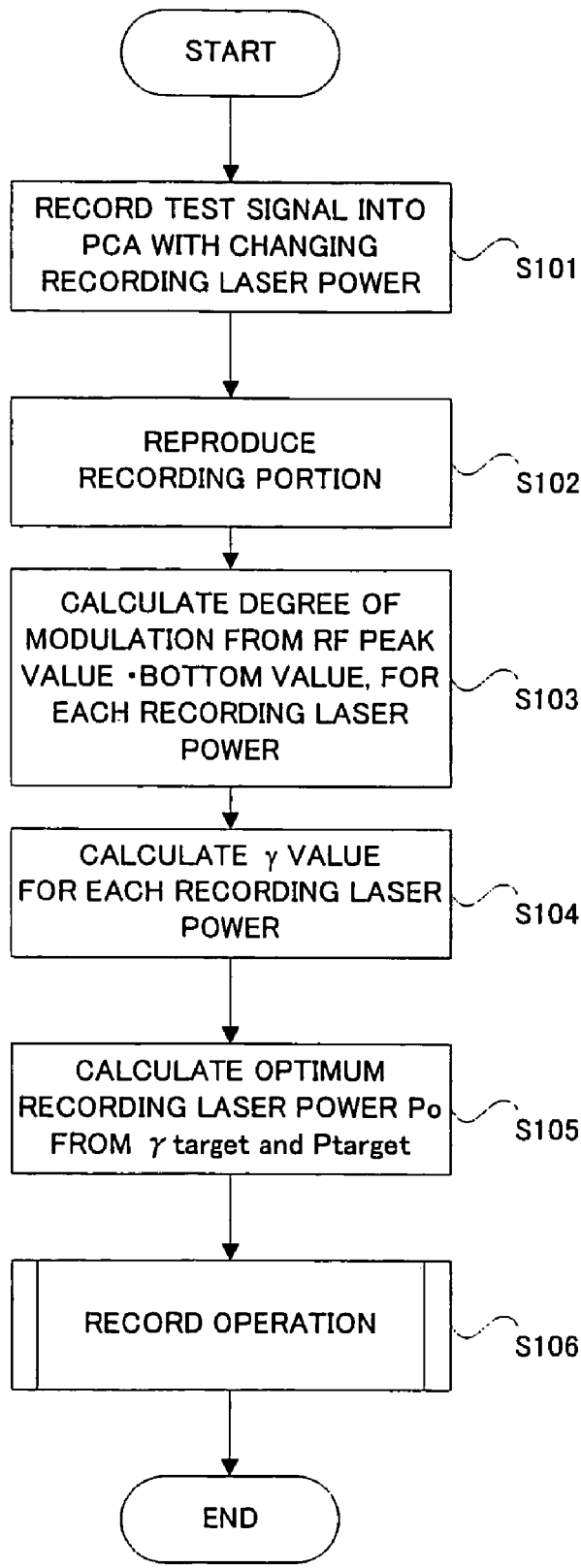
FIG. 2 is a flowchart showing a flow of an entire OPC processing out of a record operation of the information recording apparatus in the embodiment.

At first, with reference to FIG. 2, the outline of the OPC processing out of the record operation of the information recording apparatus in the embodiment will be explained. FIG. 2 shows a flow of the entire OPC processing out of the record operation of the information recording apparatus in the embodiment.

In FIG. 2, firstly, when the optical disc 100 is loaded, a seek operation is performed by the optical pickup 352, under the control of the CPU 355, to thereby obtain various data for management, required for the record operation with respect to the optical disc 100. On the basis of the data for management, the data is recorded onto the optical disc 100 via an interface, in accordance with an instruction from the external operation equipment 362 or the like, for example, by the control of the CPU 355.

Then, under the control of the CPU 355, which is one specific example of the "calculating device" of the present invention, a test signal (or data for trial writing), such as an OPC pattern, is recorded into a Power Calibration Area (PCA) by changing the recording laser power of the laser light (step S101). Namely, the OPC processing is performed. This PCA is placed in a lead-in area, which locates on the inner circumferential side of the optical disc 100, and a lead-out area, which locates on the outer circumferential side, for example. The PCA is provided as an area to perform the OPC processing therein.

Figure 3:
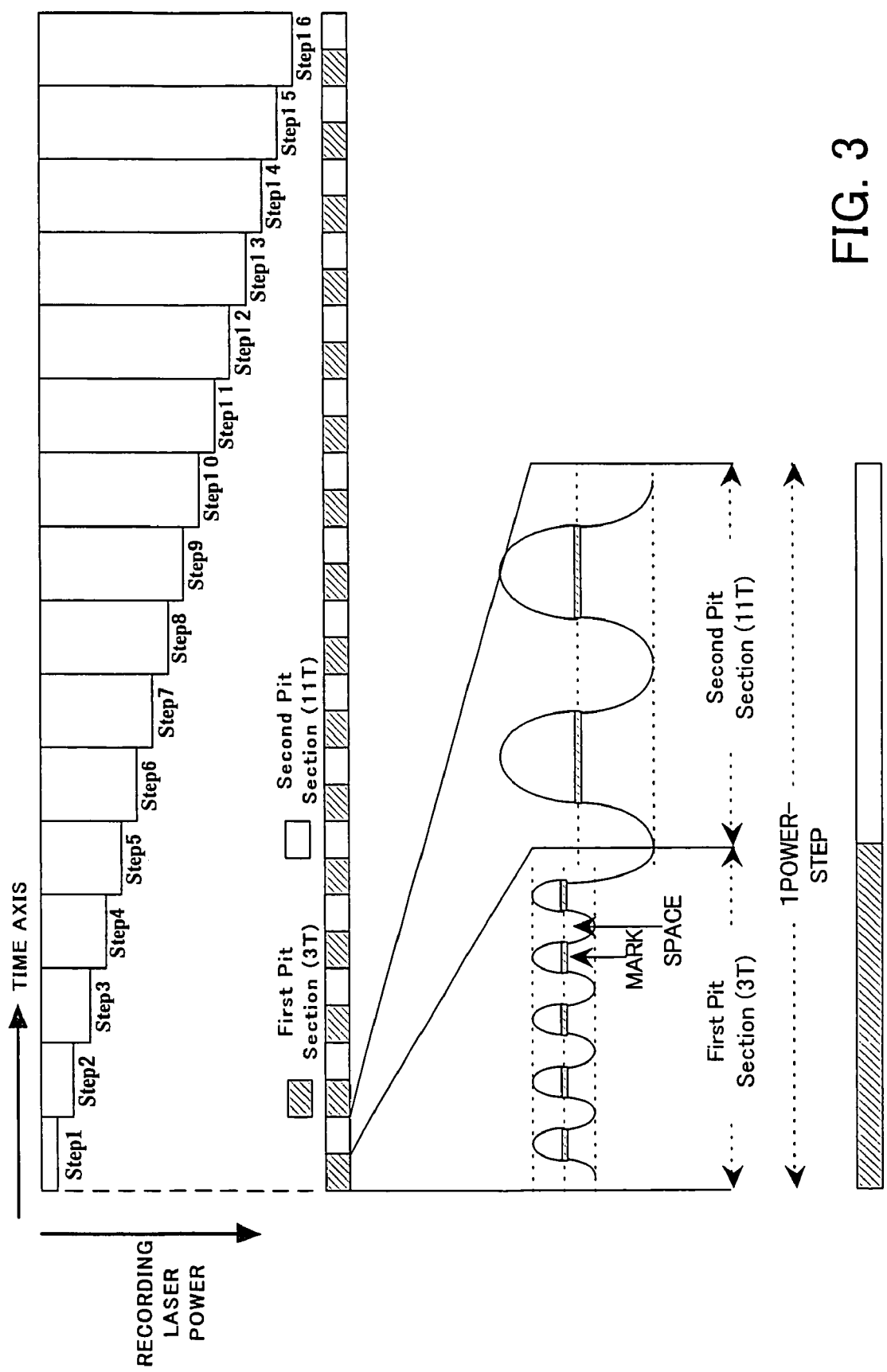
FIG. 3 is a schematic timing chart showing one OPC processing in the case of 16 power-steps in an operation of the information recording apparatus in the embodiment.

Now, the OPC processing will be explained in detail with reference to FIG. 3. FIG. 3 shows one OPC processing in the case of 16 power-steps in the operation of the information recording apparatus in the embodiment.

At first, under the control of the CPU 355, the optical pickup 352 is displaced to the PCA on the optical disc 100. Then, the test signal, such as the OPC pattern, is recorded into the PCA with changing the recording laser power, step-by-step sequentially (i.e. at mutually different 16 power-steps). Specifically, the test signal, such as a reference OPC pattern shown in FIG. 3, is recorded. As the test signal, 3T to 11T or 14T random patterns (marks/spaces) are listed as one example. Such OPC patterns are made in accordance with a predetermined strategy, under the control of the CPU 355. FIG. 3 shows, as one specific example, an aspect of recording an OPC pattern including: a first pit section in which a 3T pattern test signal is recorded out of the random patterns; and a second pit section in which a 11T pattern test signal is recorded, for each recording laser power, which is changed step-by-step. Obviously, it may be constructed such that different OPC patterns are used for each recording laser power, which is changed step-by-step.

The LD controller 359 drives a semiconductor laser in the optical pickup 352 to change the recording laser power, step-by-step sequentially, in accordance with the OPC pattern.

Back in FIG. 2 again, after the recording of the test signal into the PCA is completed, a recording portion (i.e. the OPC pattern) in the PCA is reproduced, under the control of the CPU 355 (step S102).

Then, for each recording power, degree of modulation is calculated from the RF peak value and the RF bottom value of the reproduced RF signal (step S103). Specifically, for each recording power, which is changed step-by-step, the peak value and the bottom value of envelope detection of the RF signal are sampled by the operation of the RF peak/bottom holding device 357. The OPC pattern as described above is reproduced in accordance with the number of the recorded OPC patterns, in one OPC processing, for example.

Figure 4:
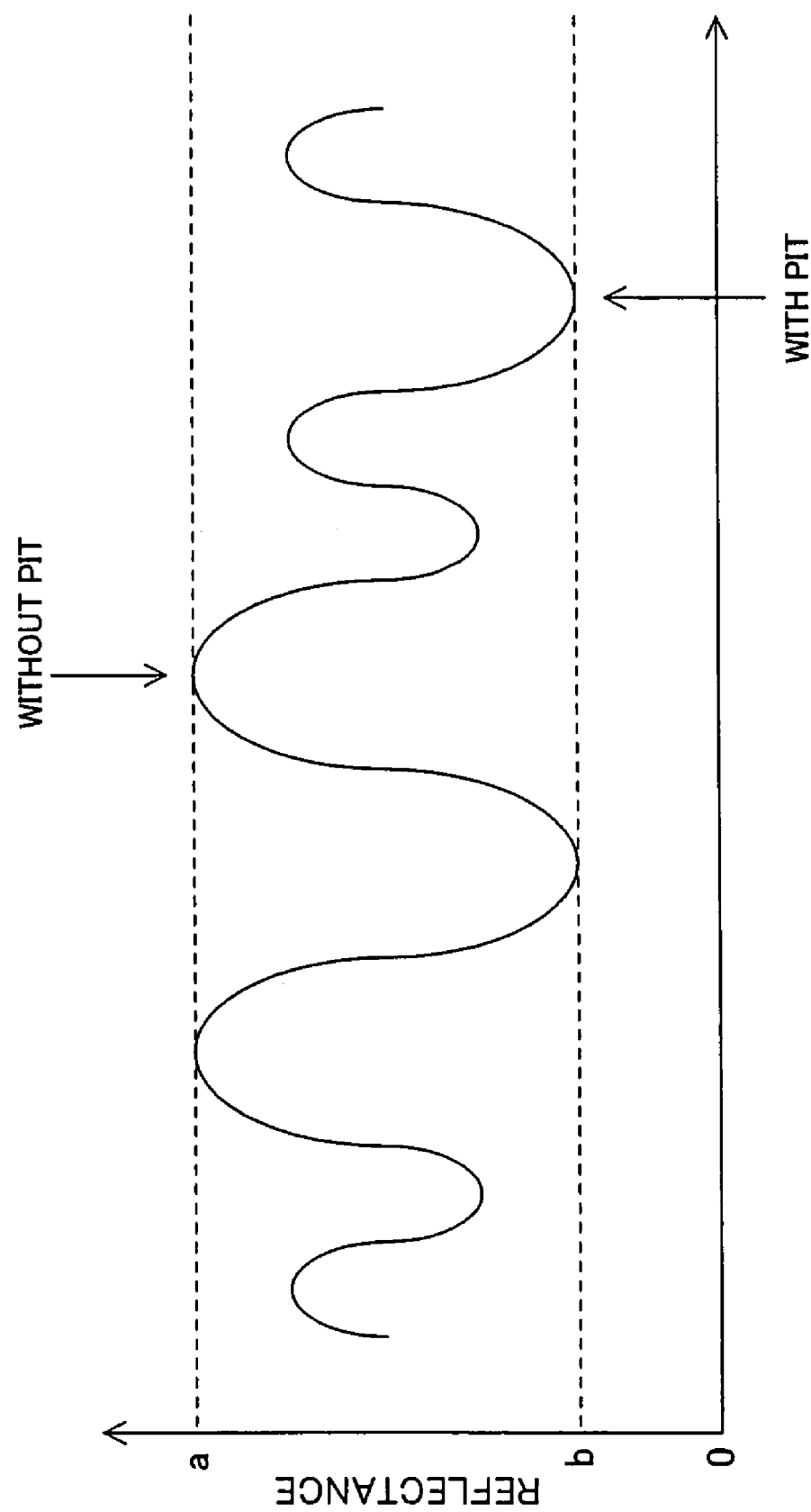
FIG. 4 is a graph conceptually showing a waveform of a Radio Frequency (RF) signal reproduced by the information recording apparatus in the embodiment.

Now, the degree of modulation calculated from the RF signal will be explained with reference to FIG. 4. FIG. 4 conceptually shows a waveform of a RF signal reproduced by the information recording apparatus in the embodiment.

As shown in FIG. 4, the RF signal has relatively low reflectance in the case that a portion where a pit is formed is reproduced on the optical disc 100. On the other hand, the RF signal has relatively high reflectance in the case that a portion where a pit is not formed is reproduced on the optical disc 100.

If the smallest reflectance of the RF signal is "b" and the largest reflectance of the RF signal is "a", the degree of modulation "m" is shown in an equation (1). Then, in this manner, the degree of modulation "m" is calculated for each recording power, which is changed step-by-step sequentially.

$$m = (a-b)/a \tag{1}$$

Again, in FIG. 2, a γ value is calculated for each power, on the basis of the degree of modulation m calculated in the step S103 (step S104). If the recording power is Pw, the γ value is shown in an equation (2).

$$\gamma = dm/dPw \times Pw/m \tag{2}$$

Then, an optimum recording laser power Po, which is one specific example of the "optimum output value" of the present invention, is calculated from $\gamma_{target}$, which indicates a targeted γ value, and $P_{target}$, which indicates a recording laser power realizing the $\gamma_{target}$ (step S105).

The $\gamma_{target}$ and the calculation of the optimum recording laser power Po and the like will be explained in more detail with reference to FIG. 5.

Figure 5:
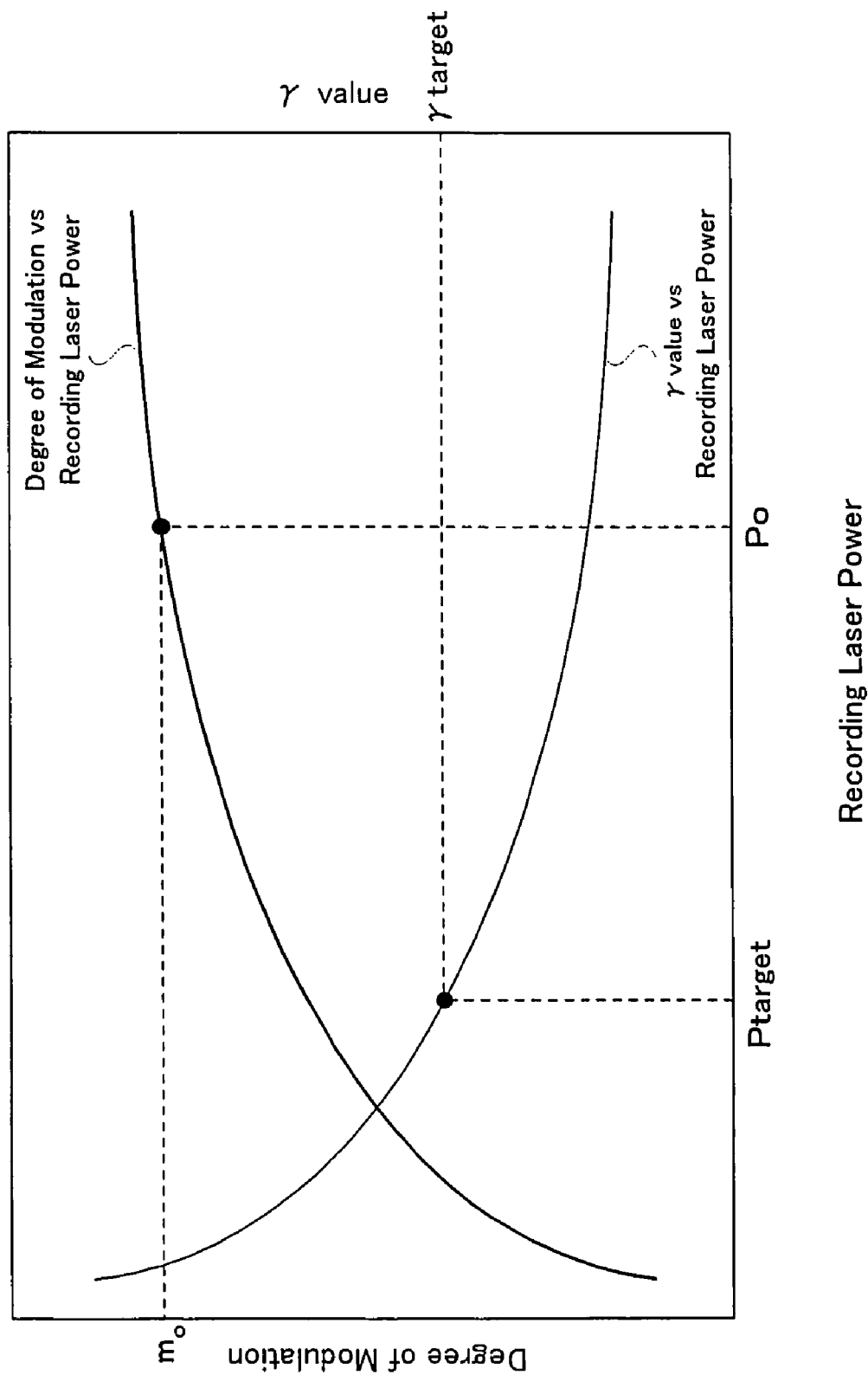
FIG. 5 is a graph conceptually showing a correspondence relationship between a γ value or degree of modulation and a recording laser power, obtained by the information recording apparatus in the embodiment.

FIG. 5 shows a correspondence relationship between the γ value or the degree of modulation m and the recording laser power. The correspondence relationship between the degree of modulation m and the recording laser power can be obtained in the calculation process for the degree of modulation m in the step S103 in FIG. 2. The correspondence relationship between the γ value and the recording laser power can be obtained in the calculation process for the γ value in the step S104 in FIG. 2. Incidentally, in these calculation processes, the degree of modulation m or the γ value corresponding to the values of the recording laser power which is discretely distributed is calculated. However, it may be constructed such that on the basis of these values, approximation curves (or approximation functions) as shown in FIG. 5 are obtained by using a statistical or mathematic manner, such as the least-square method.

Then, the recording laser power which realizes the $\gamma_{target}$ is obtained from the graph shown in FIG. 5. The $\gamma_{target}$ is a predetermined γ value and a parameter determined for each optical disc 100. For example, the $\gamma_{target}$ is determined in advance, in manufacturing the optical disc 100. Alternatively, the manufacturer of the optical disc 100 may be identified in loading the optical disc 100, to thereby set a predetermined value as the $\gamma_{target}$ in the information recording apparatus 300. The recording laser power which realizes the $\gamma_{target}$ is referred to as $P_{target}$. The optimum recording laser power Po is calculated by multiplying the $P_{target}$ by a predetermined coefficient ρ. Namely, Po=ρ×$P_{target}$.

The calculated optimum recording laser power Po is recorded into the memory 356, which is one specific example of the "reference-output-value holding device" of the present invention. Moreover, it may be constructed such that numerical values (or approximation functions and tables or the like) which indicate various correspondence relationships as shown in FIG. 5 are also recorded into the memory 356.

Again, in FIG. 2, after the calculation of the optimum recording laser power Po, the record operation of recording various data including the typical contents data or the like is performed (step S106).

Figure 6:
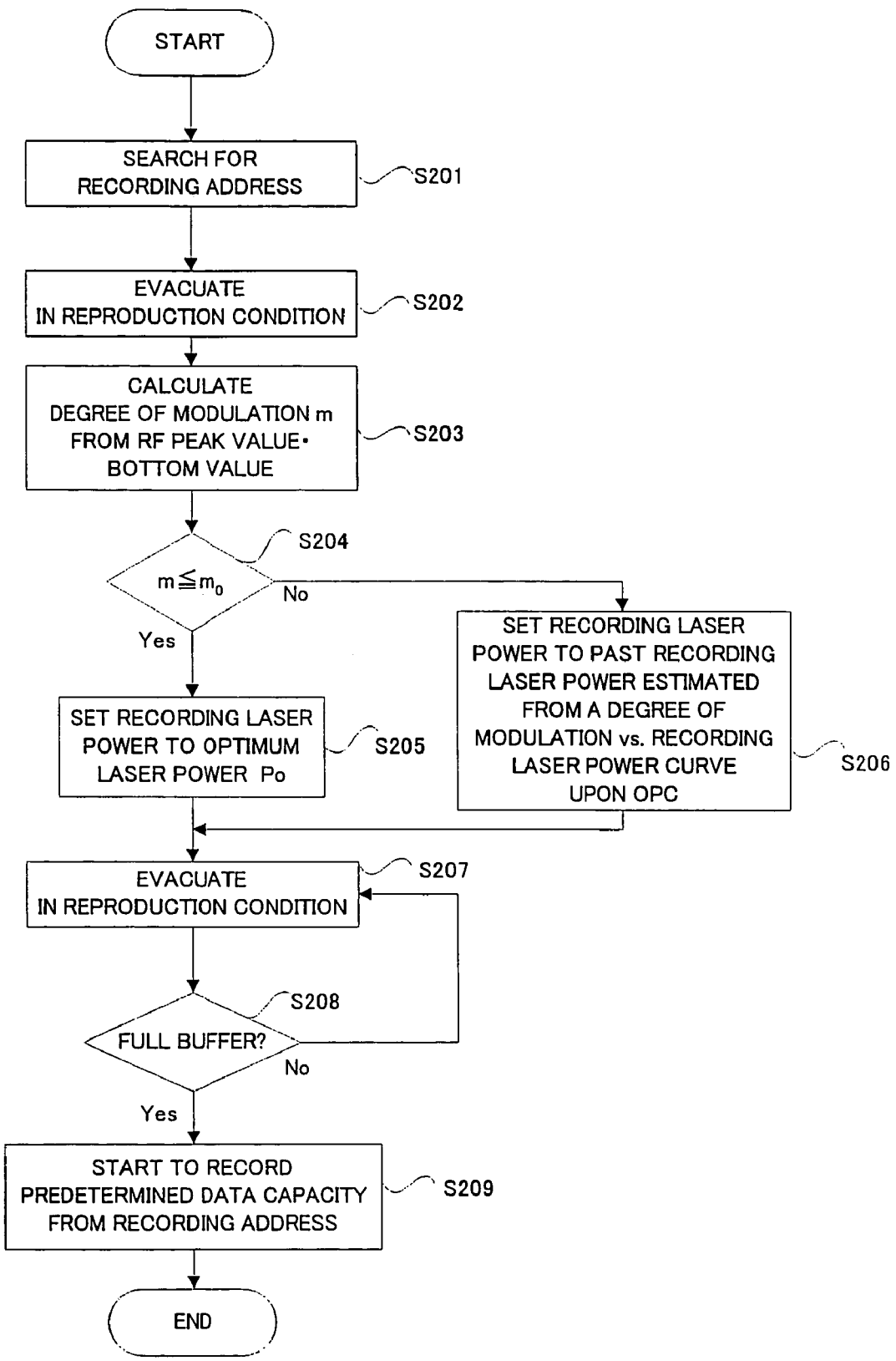
FIG. 6 is a flowchart conceptually showing an operational flow associated with a data record operation out of the record operation of the information recording apparatus in the embodiment.

Next, with reference to FIG. 6, the record operation of recording various data will be explained in more detail. FIG. 6 conceptually shows an operational flow associated with the data record operation of the information recording apparatus in the embodiment.

As shown in FIG. 6, at first, a recording address at which the recording of the data is started is searched for (step S201). This address value can be searched for by reading wobble, LPP (Land Pre Pit) or pre-recording marks or the like, which are formed on the optical disc 100.

Then, the information recording apparatus 300 evacuates in a reproduction condition (step S202). Specifically, the information recording apparatus 300 stands by, while irradiating laser light onto the optical disc 100 with a relatively low laser power as compared to the recoding laser power. During this time, the data for recording is encoded by the DVD encoder 361, and the encoded data is stored into the buffer 360.

During this evacuation condition, the RF signal corresponding to the condition of a recording area in which the data will be recorded from now (i.e. a recording area in which the laser light with a relatively low laser power is being irradiated) is detected. Then, under the control of the CPU 355, which,is one specific example of the "estimating device" of the present invention, the degree of modulation m of this RF signal, which is one specific example of the "degree of modulation of an existing record" of the present invention, is calculated by the operation of the RF peak/bottom holding device 357 (step S203). Here, the degree of modulation m is calculated in the same manner as in the above-described operation. Then, from the degree of modulation m, it is possible to estimate the recording laser power when the data was recorded in the past in this recording area, on the basis of the correspondence relationship between the degree of modulation and the recording laser power obtained in the step S103 in FIG. 2.

Then, under the control of the CPU 355, an inequality between the degree of modulation m calculated in the step S203 and the degree of modulation mo corresponding to the optimum recording laser power Po is judged (step S204). This judgment is not limited to comparison of the degree of modulation, but may be comparison between the optimum recording laser power Po and the recording laser power which realizes the degree of modulation m. In other words, the judgment of the degree of modulation here is equal to the judgment of an inequality between the recording laser power of the past and the optimum recording laser power Po.

As a result of the judgment, if it is judged that the degree of modulation m calculated in the step S203 is smaller than or equal to the degree of modulation mo corresponding to the optimum recording laser power Po (i.e. the recording laser power of the past is smaller than or equal to the optimum recording laser power Po) (the step S204: Yes), the output power of the laser light is set to the optimum recording laser power Po (step S205). Specifically, under the control of the CPU 355, the output of the laser light irradiated from the optical pickup 352 is adjusted by the operation of the LD controller 359, which is one specific example of the "controlling device" of the present invention. At this time, the information recording apparatus 300 has evacuated in the reproduction condition, so that the output of the laser light actually being irradiated does not change. The recording laser power set here is the output of the laser light actually irradiated in recording the data.

On the other hand, if it is judged that the degree of modulation m calculated in the step S203 is larger than the degree of modulation mo corresponding to the optimum recording laser power Po (i.e. the recording laser power of the past is larger than the optimum recording laser power Po) (the step S204: No), the output power of the laser light is set to the recording laser power which realizes the degree of modulation m (step S206). Namely, the output power of the laser light is set to the recoding laser power of the past when the data was actually recorded in the recording area in which the laser light in the reproduction condition is being irradiated. The value of the recording laser power is calculated on the basis of the correspondence relationship (e.g. a function and a table or the like) between the degree of modulation and the recording laser power obtained in the step S103 in FIG. 2.

Figure 7:
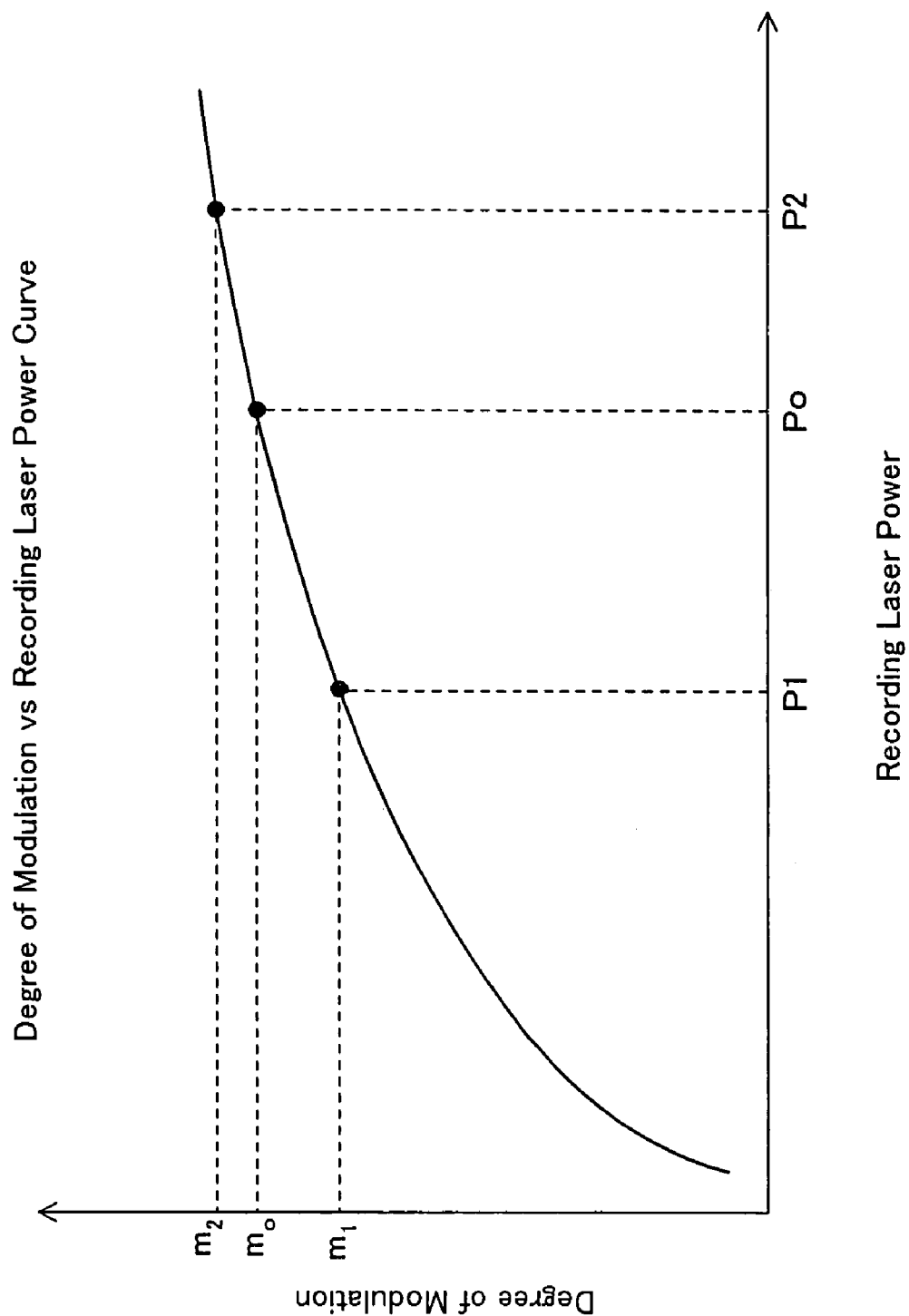
FIG. 7 is a graph conceptually showing a correspondence relationship between the degree of modulation and the recording laser power, which is used for the information recording apparatus in the embodiment.

The explanation goes on, more specifically, with reference to FIG. 7. FIG. 7 conceptually shows a correspondence relationship between the degree of modulation and the recording laser power, which are used for the information recording apparatus in the embodiment.

The graph shown in FIG. 7 shows the correspondence relationship between the degree of modulation and the recording laser power, obtained in the step S103 in FIG. 2. As shown in this graph, the degree of modulation corresponding to the optimum recording laser power Po is mo.

Now, for example, it is assumed that the degree of modulation calculated in the step S203 in FIG. 6 is m1 that is smaller than mo. At this time, the recording laser power which is set is not a recording laser power P1 corresponding to the degree of modulation m1, but the optimum recording laser power Po. On the other hand, it is assumed that the degree of modulation calculated in the step S203 in FIG. 6 is m2 that is larger than mo. At this time, the recording laser power which is set is not the optimum recording laser power Po, but a recording laser power P2 corresponding to the degree of modulation m2 (wherein P2>Po). At this time, the recording laser power P2 which realizes the degree of modulation m2 is substantially the same as the value of the recording laser power when the data was actually recorded into a recording area into which the recording will be performed. The recording laser power P2 which realizes the degree of modulation m2 can be relatively easily obtained, under the control of the CPU 355, which is one specific example of the "estimating device" of the present invention, on the basis of the correspondence relationship between the degree of modulation and the recording laser power, obtained in the step S103 in FIG. 2. In summary, if the degree of modulation m is smaller than or equal to mo, the subsequent recording is performed with the optimum recording laser power Po. On the other hand, if the degree of modulation m is larger than mo, the subsequent recording is performed with the recording laser power larger than the optimum recording laser power Po.

Again, in FIG. 6, the information recording apparatus 300 evacuates in the reproduction condition again (step S207). Then, it is judged whether or not the buffer 360 is in full condition (step S208). Specifically, it is judged whether or not the data having a data size corresponding to the recording capacity of the buffer 360 is stored in the buffer 360, or whether or not the buffer 360 has any free space. If the data having the data size corresponding to the recording capacity of the buffer 360 is stored in the buffer 360 (i.e. if the buffer 360 does not have any free space), it is judged to be in full condition. On the other hand, if the data having the data size corresponding to the recording capacity of the buffer 360 is not stored in the buffer 360 (i.e. if the buffer 360 has a free space), it is judged not to be in full condition.

As a result of the judgment, if it is judged that the buffer 360 is not in full condition (the step S208: No), the information recording apparatus 300 sequentially evacuates in the reproduction condition and further stores the data into the buffer 360. On the other hand, if it is judged that the buffer 360 is in full condition (the step S208: Yes), the data is recorded from the recording address (step S209). At this time, the data having a size corresponding to a predetermined data amount (i.e. the data capacity of the buffer 360) is recorded. At this time, the output of the laser light irradiated from the optical pickup 352 is the recording laser power set in the step S205 or the step S206.

Then, after the data having the predetermined data amount is recorded, the operations from the step S201 are repeated again. Then, the degree of modulation of a recording area to record next is calculated, to thereby set the recording laser power.

Figure 8:
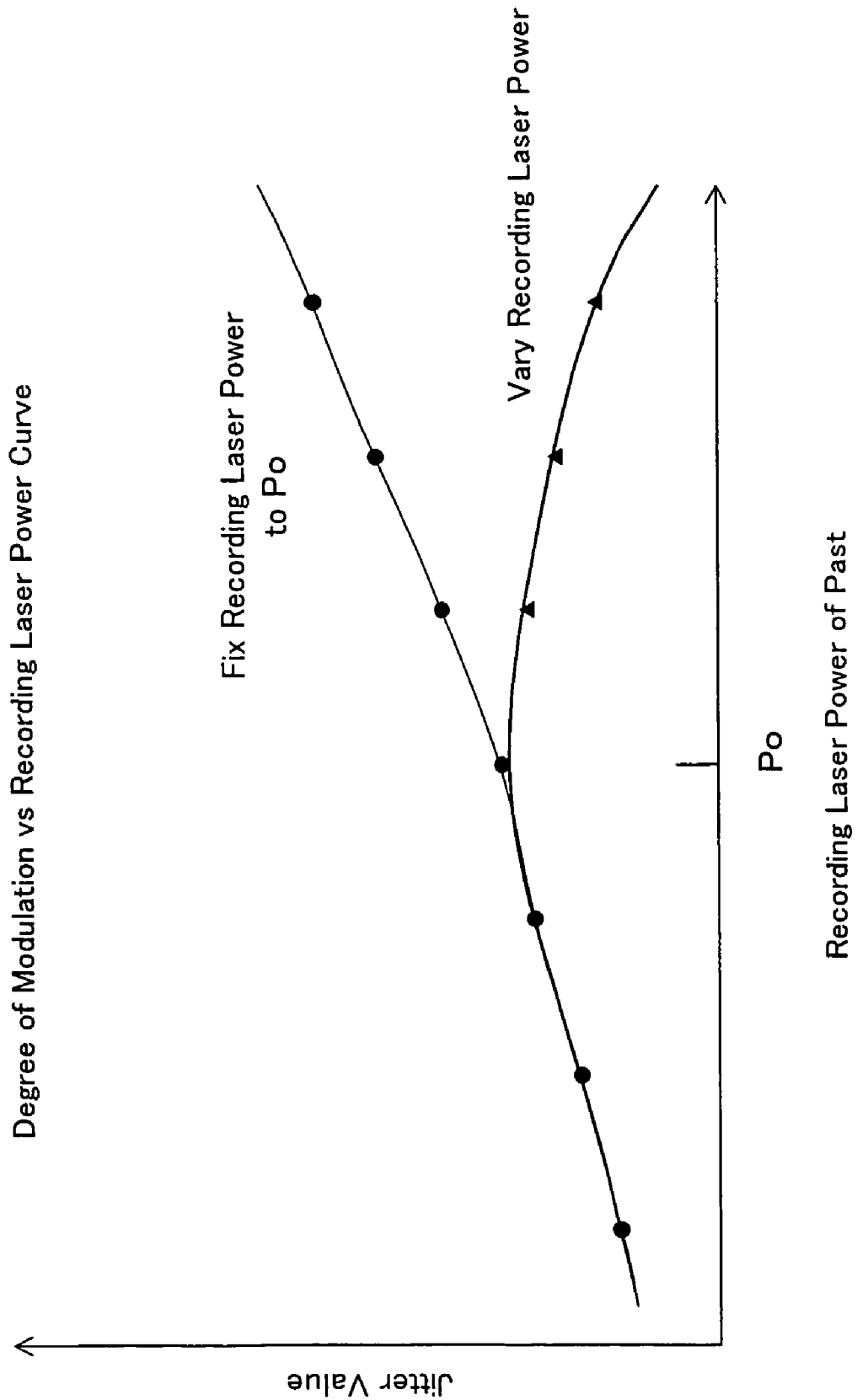
FIG. 8 is a graph conceptually showing a correspondence relationship between a jitter value and the recording laser power of the past.

As described above, it is possible to improve the recording quality of the data by changing the recording laser power in accordance with the degree of modulation obtained by reproducing the data already recorded in the recording area, into which the data will be recorded from now (in other word, in accordance with the recoding laser power when the data was recorded in the past in the recording area). The recording quality will be explained in more detail with reference to FIG. 8. FIG. 8 conceptually shows a correspondence relationship between a jitter value and the recording laser power of the past.

As shown in FIG. 8, the recording laser power when the data was recorded in a certain recording area (i.e. the recording laser power of the past) is plotted along a horizontal axis, and the reproduced jitter value of the data newly recorded into the certain recording area is plotted along a vertical axis. As is clear from this graph, if the recording is continued by using the recording laser power fixing to the optimum recording laser power Po (i.e. if the Direct Overwrite is continued), the jitter value increases as the recording laser power of the past increases. The reason is described subsequently. The recording laser power of the past becomes larger, the crystalline on a recording surface of the optical disc 100 changes more heavily, so that even if the record operation is performed with the optimum recording laser power Po which is smaller than the recording laser power of the past, the change of the crystalline formed by the previous record operation cannot be all rewritten.

On the other hand, as in the operation in the embodiment described above, if the recording is continued by changing the recording laser power as occasion demands (specifically, by using the recording laser power which is larger than the optimum recording laser power Po), it is obvious that the jitter value becomes smaller in the case where the recording laser power becomes larger than the optimum recording laser power Po. This is because the change of the crystalline can be substantially all rewritten by recording the data with the recording laser power substantially equal to the recording laser power of the past. Incidentally, in a range where the recording laser power of the past is smaller than the optimum recording laser power Po, the data is recorded with the optimum recording laser power Po, so that obviously, there is not any change in the jitter value, as compared to the case where the recording is continued with the recording laser power fixing.

As explained above, according to the information recording apparatus in the embodiment, it is possible to greatly improve the recording quality. Namely, regardless of the inequality of the recording laser power when the data was recorded in the past, it is possible to properly improve the recording quality (or record property) of the data. Moreover, when the data recorded in this manner is reproduced, it is possible to achieve excellent reproduction quality (or reproduction property).

Particularly, in the embodiment, a time length required for the storage of the data into the buffer 360 is used for the calculation of the recording laser power of the past or the like. Therefore, there is also an advantage of no or little influence on the typical record operation.

Moreover, it may be also constructed to change whether the record operation is performed with the recording laser power fixing or with the record laser power changing as occasion demands under the control of the CPU 355 (which is one specific example of the "selecting device" of the present invention), in accordance with a user's instruction from the external operation equipment 362. By constituting in this manner, the change operation for the recording laser power is unnecessary, so that there is a large advantage, in serious consideration of the speed-up of the record operation rather than the improvement of the recording quality.

Moreover, it may be also constructed such that the degree of modulation m is obtained throughout the surface of the optical disc 100 in advance before the record operation. By this, it is unnecessary to perform a comparison operation of comparing the degree of modulation m or the like, during the record operation, so that there is such an advantage that it is possible to further speed up the record operation.

Incidentally, if the data is newly recorded into a recording area in which the data is not recorded, the data may be obviously recorded with the optimum recording laser power Po. In this case, it is preferable to omit the operation of calculating the degree of modulation or the like, as described above. The search for the recording area in which the data is unrecorded (or an unrecorded area) may be performed before the record operation, or during the record operation, for each recording area into which the data will be recorded from now. Moreover, it may be also constructed such that the unrecorded area is searched for by performing RF end seek, in loading the optical disc 100 into the information recording apparatus 300. In the case of the disk-shaped optical disc, the RF end seek indicates to trace the optical pickup from the inner to the outer circumferential side of the optical disc 100, to thereby search for a position at which the RF signal is not detected any more. Namely, the position at which the RF signal is not detected any more corresponds to a boundary between the recording area in which the data is already recorded and the recording area in which the data is unrecorded.

Incidentally, in the above-described embodiment, the optimum recording laser power is calculated on the basis of the degree of modulation m and the y value, however, without limiting to this manner, an asymmetry value or the like may be used for the calculation of the optimum recording laser power. At this time, in the step S204 in FIG. 6, it is preferable to perform the comparison operation by using the asymmetry value or the like, in place of the degree of modulation m. Even in this manner, it is possible to receive the above-described various benefits.

Moreover, in the embodiment, the optimum recording laser power Po (or the degree of modulation mo corresponding to the optimum recording laser power Po) is used as a comparison reference (i.e. one specific example of the "reference output value" of the present invention) in the step S204 in FIG. 6, however, the present invention is not limited to this manner. For example, the $P_{target}$ may be the comparison reference, or a predetermined value other than the $P_{target}$ may be the comparison reference. In this case, the value of the comparison reference is preferably stored in the memory 356 (which is one specific example of the "reference output value holding device" of the present invention). Or the value of the comparison reference may be recorded on the optical disc 100 in advance and may be stored in the memory 356 by reading the comparison reference from the optical disc 100.

(1) FIRST MODIFIED OPERATION EXAMPLE

Figure 9:
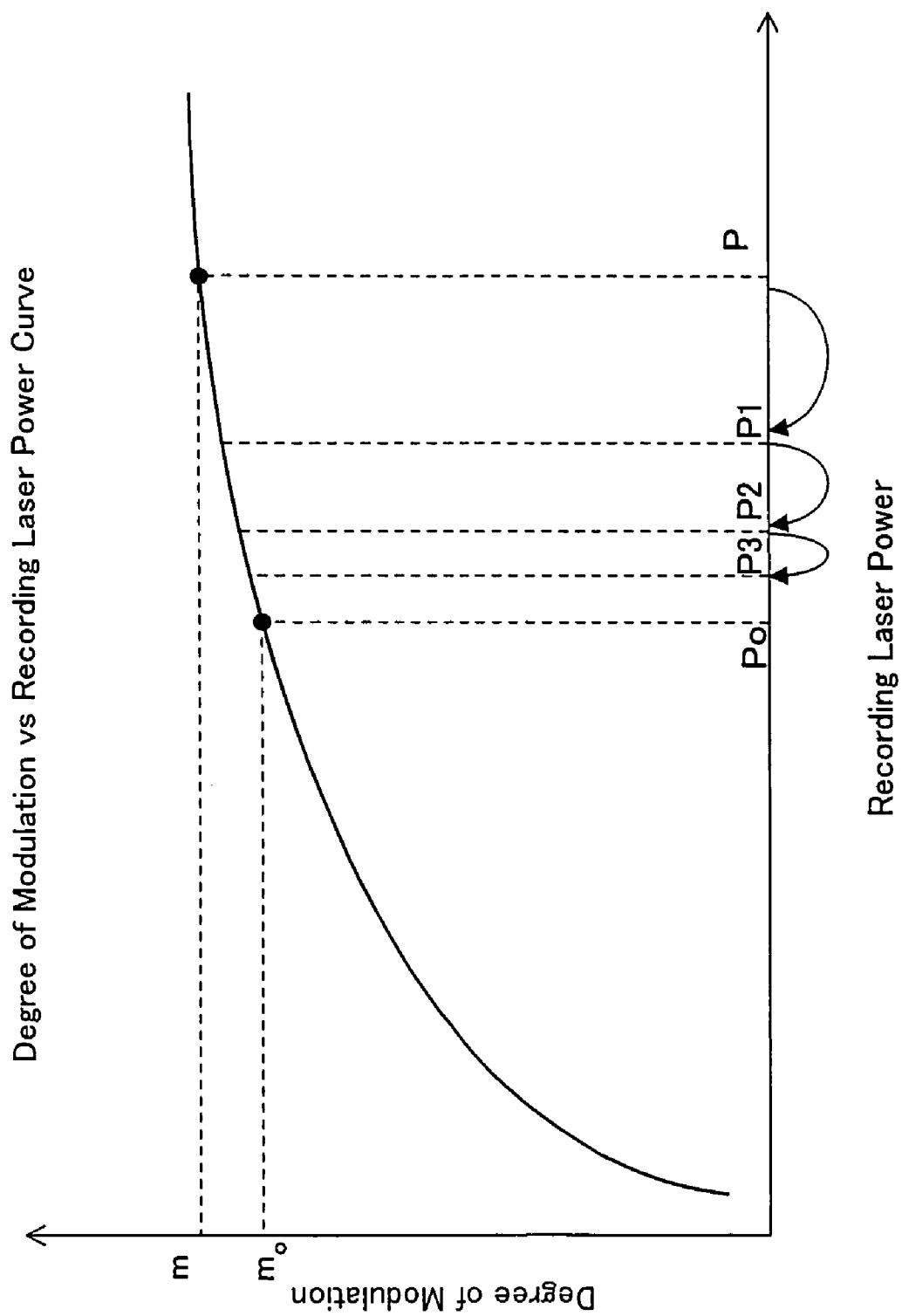
FIG. 9 is a graph conceptually showing a correspondence relationship between the degree of modulation and the recording laser power, which is used for the information recording apparatus in the embodiment.

Next, with reference to FIG. 9, the first modified operation example of the information recording apparatus in the embodiment will be explained. FIG. 9 conceptually shows a correspondence relationship between the degree of modulation and the recording laser power.

As shown in FIG. 9, in the first modified operation example, if the degree of modulation m calculated in the step S203 in FIG. 6 satisfies m>mo, the value P1, which is the mean value of a recording laser power P which realizes the degree of modulation m and the optimum recording laser power Po (i.e. P1=(P+Po)/2), is set as the recording laser power.

In this case, if the Direct Overwrite is further performed into the recording area in which the data was recorded with the recording laser power P1, the degree of modulation m, which is detected in the step S203, is the value of the degree of modulation corresponding to the recording laser power P1. Therefore, if the Direct Overwrite is performed afterward, the value P2, which is the mean value of the optimum recording laser power Po and the recording laser power P1 (i.e. P2=(P1+Po)/2), is set as the recording laser power.

By repeating such a record operation many times, eventually, the recording laser power when the data is recorded into the recording area substantially converges on the optimum recording laser power Po. Therefore, it is possible to improve the recording quality of the data, more preferably.

Incidentally, in the above-described operation example, the record operation is performed with the recording laser power corresponding to the mean value of the recording laser power of the past (e.g. P and P1 or the like) and the optimum recording laser power Po, however, the present invention is not limited to this manner. Namely, if it is constructed such that the record operation is performed with the recording laser power which is smaller than the recording laser power of the past and which is larger than the optimum recording laser power, it is possible to receive the above-described various benefit. For example, if it is desired to converge the recording laser power on the optimum recording laser power Po as quickly as possible, a smaller value than the mean value may be set as the recording laser power. Moreover, if it is desired to seriously consider the recording quality of the data, a larger value than the mean value may be set as the recording laser power. As described above, if m>mo is satisfied, the recording laser power may be set flexibly.

(2) SECOND MODIFIED OPERATION EXAMPLE

Next, with reference to FIG. 10, the second modified operation example of the information recording apparatus in the embodiment will be explained. FIG. 10 shows the recording surface of the optical disc onto which the data is recorded by the information recording apparatus in the embodiment.

It is assumed that the Direct Overwrite, as in the above-described embodiment, is performed with respect to the optical disc 100, which is disk-shaped as shown in FIG. 10. At this time, it may be constructed such that the recording areas of the optical disc 100 are divided into three divisional areas on (i) an inner circumferential side area; (ii) a central circumferential side; and (iii) an outer circumferential side, and that the degree of modulation m is calculated for each divisional area. For example, it may be constructed such that the degree of modulation m is calculated in a recording area (or recording point) C in the case of the divisional area on the inner circumferential side, in a recording area (or recording point) B in the case of the divisional area on the central circumferential side, and in a recording area (or recording point) A in the case of the divisional area on the outer circumferential side. If the data is recorded into a recording area on the inner circumferential side (i.e. a recording area in substantially the same condition as that of the recording area C), the recording laser power is set on the basis of the degree of modulation calculated in the recording area C. Moreover, if the data is recorded into a recording area on the central circumferential side (i.e. a recording area in substantially the same condition as that of the recording area B), the recording laser power is set on the basis of the degree of modulation calculated in the recording area B. If the data is recorded into a recording area on the outer circumferential side (i.e. a recording area in substantially the same condition as that of the recording area A), the recording laser power is set on the basis of the degree of modulation calculated in the recording area A.

Even in such construction, it is possible to receive the above-described various benefits, which is the improvement of the recording quality of the data. This is because, according to an aspect of the record operation of the existing optical disc in which the data is substantially recorded from the inner to the outer circumferential side, the data is recorded into recording areas located on the inner circumferential side, with substantially the same recording laser power. Moreover, in the same manner, it can be said that the data is recorded into recording areas located on the central circumferential side, with substantially the same recording laser power, and that the data is recorded into recording areas located on the outer circumferential side, with substantially the same recording laser power.

Without adopting the aspect of the record operation in which the data is recorded from the inner to the outer circumferential side, if it is constructed such that the divisional area is provided for recording areas having substantially the same record condition in accordance with the record operation on the optical disc 100, it is possible to receive the above-described various benefit.

Incidentally, the same construction may be adopted in not only the disk-shaped optical disc but also optical discs in various types of shapes. Moreover, the number of the divisional areas is not limited to three, but the recording areas may be divided into two, four or more divisional areas. More preferably, the recording areas are divided into a plurality of divisional areas so that it is possible to distinguish the recording area in which the data was recorded with substantially the same recording laser power in the past.

Moreover, in the above-described embodiment, the optical disc 100 is explained as one example of the information recording medium, and the recorder associated with the optical disc 100 is explained as one example of the information recording apparatus. The present invention, however, is not limited to the optical disc and the recorder thereof, and can be applied to other various high-density-recording or high-transmission-rate information recording media, and the recorders thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-003069 filed on Jan. 8, 2004 including the specification, claims, drawings and summary is incorporated herein by reference in its entirety.

What is claimed is:

1. An information recording apparatus comprising:
    a recording device for recording information into recording areas of an information recording medium by irradiating laser light;
    a reference output value holding device for holding a reference output value of the laser light for recording the information into the recording areas;
    an estimating device for estimating an output value of the laser light which was irradiated in the past to an already recorded area in which the information is already recorded, out of the recording areas; and
    a controlling device for controlling said recording device to irradiate the laser light onto the already recorded area with an output value larger than the reference output value if the estimated output value is larger than the reference output value.

2. The information recording apparatus according to claim 1, further comprising a calculating device for calculating an optimum output value of the laser light for recording the information into the recording areas, wherein
    the reference output value is substantially the optimum output value calculated by said calculating device.

3. The information recording apparatus according to claim 2, wherein said calculating device calculates the optimum output value on the basis of a correspondence relationship between the output value of the laser light and degree of modulation, which indicates recording quality of the information.

4. The information recording apparatus according to claim 1, wherein said controlling device controls said recording device to irradiate the laser light onto the already recorded area with an output value smaller than or equal to the estimated output value.

5. The information recording apparatus according to claim 1, wherein said controlling device controls said recording device to irradiate the laser light onto the already recorded area with the reference output value, if the estimated output value is smaller than or equal to the reference output value.

6. The information recording apparatus according to claim 1, further comprising a storing device for temporarily storing the information, wherein
    said estimating device estimates the output value by using a time length to store the information into said storing device.

7. The information recording apparatus according to claim 1, wherein said estimating device estimates the output value in said information recording medium, before the information is recorded.

8. The information recording apparatus according to claim 1, wherein said controlling device controls said recording device to irradiate the laser light onto both the already recorded area and a recording area in a substantially same record condition as that of the already-recorded area, with an output value larger than the reference output value.

9. The information recording apparatus according to claim 1, further comprising a selecting device for selecting whether or not said recording device is controlled by said controlling device, wherein
    said controlling device controls said recording device if it is selected by said selecting device that the recording device is controlled.

10. The information recording apparatus according to claim 1, wherein said estimating device detects degree of modulation of an existing record, which indicates recording quality of the information already recorded in the already recorded area, and estimates the output value on the basis of the detected degree of modulation of an existing record and a correspondence relationship between the output value of the laser light and degree of modulation, which indicates recording quality of the information.

11. An information recording method for recording information into recording area of an information recording medium by irradiating laser light, comprising:
    an estimating process of estimating an output value of the laser light which was irradiated in the past to an already recorded area in which the information is already recorded, out of the recording areas; and
    a controlling process of controlling a recording device to irradiate the laser light onto the already recorded area with an output value larger than a reference output value if the estimated output value is larger than the reference output value.

12. A computer program product in a computer-readable medium for tangibly embodying a program of instructions executable by a computer in an information recording apparatus to make the computer function as at least one of an estimating device and a controlling device,
    said information recording apparatus comprising:
    said recording device for recording information into recording areas of an information recording medium by irradiating laser light;
    said reference output value holding device for holding a reference-output-value of the laser light for recording the information into the recording areas;
    said estimating device for estimating an output value of the laser light which was irradiated in the past to an already recorded area in which the information is already recorded, out of the recording areas; and
    said controlling device for controlling said recording device to irradiate the laser light onto the already recorded area with an output value larger than the reference output value if the estimated output value is larger than the reference output value.

* * * * *